United States Patent [19]

Yamamoto

[11] 4,247,170

[45] Jan. 27, 1981

[54] ZOOMING STRUCTURE OF INTERCHANGEABLE CAMERA LENS

[75] Inventor: Noboru Yamamoto, Numata, Japan

[73] Assignee: Chino Optical Co., Ltd., Tokyo, Japan

[21] Appl. No.: 94,310

[22] Filed: Nov. 13, 1979

[30] Foreign Application Priority Data

May 19, 1979 [JP] Japan ..................... 54-67178[U]

[51] Int. Cl.³ ................ G02B 7/10; G02B 15/18
[52] U.S. Cl. .......................... 350/430; 350/255
[58] Field of Search .......................... 350/187

[56] References Cited

U.S. PATENT DOCUMENTS

| | | | |
|---|---|---|---|
| 3,731,987 | 5/1973 | Iida et al. | 350/187 |
| 3,765,748 | 10/1973 | Mito | 350/187 |
| 4,114,984 | 9/1978 | Muryoi | 350/187 |
| 4,168,884 | 9/1979 | Tesch | 350/187 |

*Primary Examiner*—Jon W. Henry
*Attorney, Agent, or Firm*—Wenderoth, Lind & Ponack

[57] ABSTRACT

In an interchangeable camera lens having a cam sleeve rotatable by a sliding movement of an operation ring, the cam sleeve comprises a first cam slot for moving lens of variable magnification and a second cam slot for moving lens of focus compensation. The first cam slot has a first rectilinear portion inclined at a predetermined angle with respect to the axial direction of the cam sleeve and a second portion angled from the front end of the rectilinear portion toward the circumferential direction thereof. The second cam slot has a first arc-shaped portion and a second portion angled rearwardly from the end of the arc-shaped portion.

6 Claims, 2 Drawing Figures

ZOOMING STRUCTURE OF INTERCHANGEABLE CAMERA LENS

BACKGROUND OF THE INVENTION

This invention relates to a zooming structure of an interchangable camera lens and, most particularly, to a zooming structure of the kind set forth above which allows both telephotographing and closeup photographing of the camera.

There is a known interchangable camera lens for telephotographing in which a zooming operation is performed by sliding an operation ring straightly in the axial direction thereof while a focusing operation is performed by rotating the operation ring about the axis thereof. Such an interchangable camera lens of straight zoom type has advantages due to easy operation and quick photographing compared with another type of interchangable camera lens of rotary zoom type in which the zooming and focusing operations have to be performed respectively by rotation of separate members. Accordingly, the interchangable camera lenses of straight zoom type are now becoming very popular in the field.

In one example of the interchangable camera lens of straight zoom type, four groups of lenses are provided in which a lens group for variable magnification is operatively connected with a cam slot in a cylindrical cam sleeve to move in the axial direction thereof in proportion i.e. rectilinearly, to the rotary movement of the cam sleeve, while another lens group for focus compensation is operatively connected with another cam slot in the same cam sleeve to move out of proportion, i.e. non-rectilinearly, to the rotary movement of the cam sleeve. The cylindrical cam sleeve is operatively connected with an operation ring outside the camera lens in such a manner that when the operation ring is slided in the axial direction thereof, the cam sleeve is rotated about the axis thereof. Thus, the zooming operation for telephotographing is performed by straightly sliding the operation ring.

In the above type of interchangable camera lens having four groups of lenses, it is known that in case the lens group for focus compensation only is moved back in the axial direction while the lens group for variable magnification takes the most advanced position where the focusing distance is minimum for the widest telephotographing of the camera, the photographing state of the camera lens is changed from the telephotographing state into the closeup photographing state.

However, in the conventional interchangable camera lens, although the zooming operation for the telephotographing could be made by straightly sliding an operation ring in the axial direction thereof, the closeup photographing has to be adjusted by rotating the operation ring or another separate operation ring. Also, in order to change the photographing state from telephotographing to closeup photographing, a mechanical locking means has to be released to allow the rotation of the operation ring for the closeup photographing. Thus, the mechanism and structure of the conventional interchangable zoom lens have been complicated. Furthermore, the operation to change the photographing state from telephotographing to closeup photographing has been troublesome.

Accordingly, an object of the present invention is to provide an improved zooming structure of interchangable camera lenses in which the photographing state can be changed from the telephotographing state to closeup photographing state by straightly sliding an operation ring in the axial direction thereof without manipulating any locking means.

Another object of the present invention is to provide an improved zooming structure of interchangable camera lenses which is very simple in structure and easy and reliable in operation.

A further object of the present invention is to provide an improved zooming structure of interchangable camera lens in which the sliding movement of an operation ring becomes very smooth without contacting a rotating cam sleeve.

SUMMARY OF THE INVENTION

A zooming structure of an interchangable camera lens of the present invention comprises a stationary barrel, a cam sleeve provided to rotate about an axis of the barrel, an operation ring mounted on the stationary barrel to slide thereon in the axial direction thereof, and means connected with the operation ring and slidably engaged with the cam sleeve for rotating the latter by the sliding movement of the operation ring. The cam sleeve comprises a first cam slot, in which a pin mounted to a lens for variable magnification is slidably engaged, and a second cam slot, in which a pin mounted to a lens for focus compensation is slidably engaged. The first cam slot has a first rectilinear portion inclined at a predetermined angle with respect to the axial direction of the cam sleeve and a second portion angled from the front end of the rectilinear portion toward the circumferential direction thereof. The second cam slot has a first arc-shaped portion curved rearwardly with respect to the circumferential direction of the cam sleeve and a second portion angled rearwardly from the end of the arc-shaped portion. The circumferential lengths of the first and second portions of the first cam slot are equal to those of the first and second portions of the second cam slot, respectively.

In such arrangement of the present zooming structure, when the operation ring is slided in the axial direction thereof, the cam sleeve is rotated and the both pins slidably engaged with the first and second cam slots are moved along these slots. When the both pins slide along the first portions of these cam slots, the lenses for variable magnification and for focus compensation take the telephotographing position. On the other hand, when these pins slide along the second portions of these cam slots, the above-mentioned lenses take the closeup photographing position. Thus, it becomes possible in the present invention to change the photographing state from telephotographing to closeup photographing by a very simple operation of sliding the operation ring straightly.

Preferably, the cam sleeve comprises a third rectilinear cam slot inclined with respect to the axial direction thereof with an angle larger than that of the first rectilinear portion of the first cam slot. The circumferential and axial lengths of the third cam slot are equal to the circumferential and axial lengths of the first cam slot, respectively. The means for rotating the cam sleeve is a pin connected to move together with the operation ring and slidably engaged with the third cam slot.

More preferably, the cam sleeve has a small groove in the inner surface thereof and a small ball is urged against the inner surface of the cam sleeve. This small groove is formed in such a manner that when the cam sleeve is rotated to move the pin in the first cam slot up to the front end of the first rectilinear portion thereof where is the widest telephotographing position, the small ball is engaged with the small groove.

Other objects and features of the present invention shall be described hereinafter in detail with reference to a preferred embodiment of the present invention shown in the accompanying drawings, in which

DETAILED DESCRIPTION OF THE INVENTION

Figure 1:
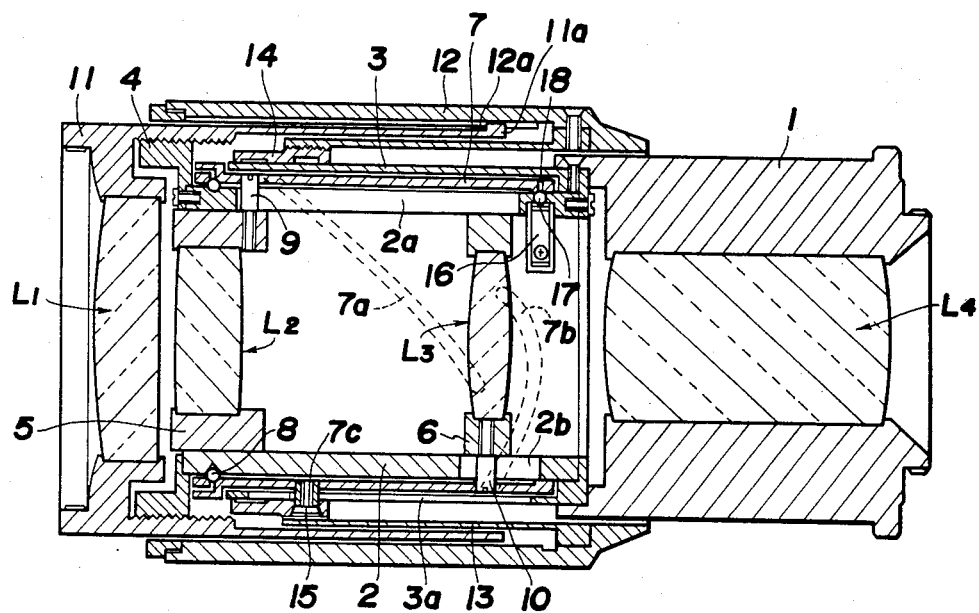
FIG. 1 is a vertically sectioned side view showing an interchangable camera lens according to an embodiment of the present invention.

Referring to an interchangable camera lens shown in FIG. 1, it comprises four lens groups, i.e. a first lens group $L_1$ for focusing, a second lens group $L_2$ for variable magnification adapted to vary the focal length, a third lens group $L_3$ for compensating light rays having passed through the first and second groups of lenses into parallel with each other, and a fourth lens group $L_4$ for focusing into images.

The fourth lens group $L_4$ is integrally fixed to a stationary lens barrel 1 which has a mounting means to be mounted on a camera body. This stationary lens barrel 1 also has a zoom sleeve 2 and a straight guide sleeve 3 integrally connected to the front end thereof. The zoom sleeve 2 has a helicoid frame 4 connected to the front end thereof.

The second and third lens groups $L_2$ and $L_3$ are secured to respective lens frames 5 and 6 which are mounted to be slidable along the inner surface of the zoom sleeve 2. The zoom sleeve 2 has two separate guide slots 2a and 2b extending longitudinally in the axial direction thereof. Rotatably mounted around the zoom sleeve 2 by means of ball bearings 8 is a cam sleeve 7. The cam sleeve 7 has three kinds of cam slots, i.e. first cam slot 7a, second cam slot 7b and third cam slots 7c—7c, through the peripheral wall thereof, the details of which shall be described hereinafter with reference to FIG. 2. Slidably provided through the guide slot 2a and the first cam slot 7a of the zoom sleeve 2 and the cam sleeve 7, respectively, is a pin 9 fixed on the outer periphery of the lens frame 5. Likewise, slidably provided through the other guide slot 2b and the second cam slot 7b of the zoom sleeve 2 and the cam sleeve 7, respectively, is another pin 10 fixed on the outer periphery of the other lens frame 6.

The first lens group $L_1$ is secured to a movable lens barrel 11 which is rotatably engaged with threads of the helicoid frame 4. Slidably and rotatably mounted on the outer periphery of the stationary barrel 1 is an operation ring 12 for zooming and focusing operations. The operation ring 12 has a longitudinal groove 12a extending along the inner surface thereof in the direction parallel to the axis thereof. The longitudinal groove 12a is engaged with a projection 11a integrally formed on the rear end of the movable lens barrel 11 in such a manner that when the operation ring 12 is moved in the axial direction thereof, the projection 11a slides along the longitudinal groove 12a and, therefore, the movable lens barrel 11 is not allowed to move together with the operation ring and that when the operation ring 12 is rotated about the axis thereof, the projection 11a engages with the longitudinal groove 12a and, therefore, the first lens group $L_1$ is moved forwardly or rearwardly along the axis due to the threaded engagement of the movable lens barrel 11 with the helicoid frame 4, thus performing focusing.

The operation ring 12 has an operation sleeve 13 integrally connected thereto in such a manner as to sandwich the movable lens barrel 11 therebetween. The operation sleeve 13 is threadedly engaged with an annular frame 14 at the front end thereof. The annular frame 14 has a pin 15 thereon which passes through the straight guide slot 3a in the guide sleeve 3 and enters into the third cam slots 7c—7c in the cam sleeve 7.

The cam sleeve 7 has a small groove 18 at the inner surface near the rear end thereof. This groove 18 is formed and arranged in such a manner that when the operation ring 12 is advanced to the widest telephotographing position and, therefore, when the cam sleeve 7 takes a predetermined rotary position, a small ball 17 being urged against the inner surface of the cam sleeve by a leaf spring 16 on the zoom sleeve 2 comes to engage with the small groove.

Figure 2:
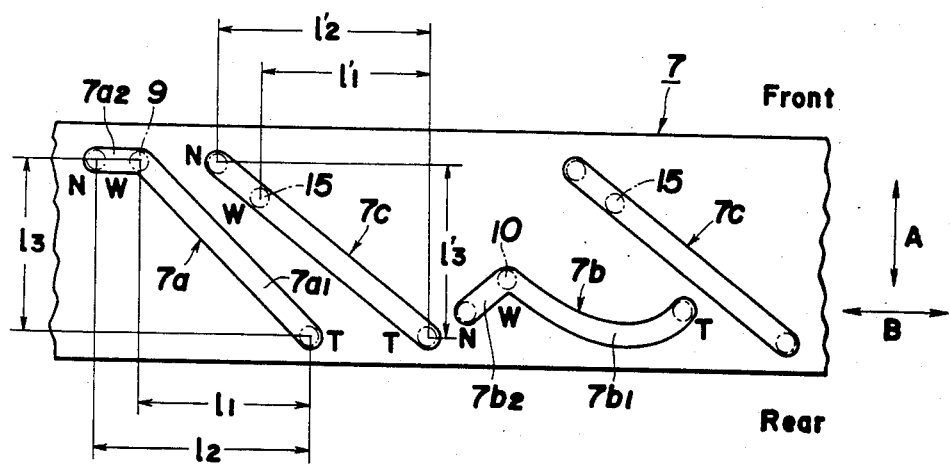
FIG. 2 is a development view of a cam sleeve adapted to the lens shown in FIG. 1.

Referring to the cam slots 7a–7c in the cam sleeve 7 shown in FIG. 2 by development, an arrow A indicates the axial direction of the cam sleeve, in which "Front" indicates an object side and "Rear" indicates focusing side, and an arrow B indicates the circumferential direction of the cam sleeve 7. The first cam slot 7a comprises a rectilinear slot portion 7a1 for variable magnification and another slot portion 7a2 for closeup photographing. The rectilinear slot portion 7a1 is inclined at a predetermined angle with respect to the axial direction of the cam sleeve indicated by arrow A, while the other slot portion 7a2 is angled from the front end, i.e. the widest telephotographing end, in the rectilinear slot portion 7a1 toward the circumferential direction of the cam sleeve indicated by arrow B. The second cam slot 7b comprises an arc-shaped cam slot portion 7b1 for focus compensation which is curved rearward with respect to the circumferential direction and another cam slot portion 7b2 for closeup photographing which is angled rearwardly from the widest telephotographing end of the arc-shaped cam slot portion 7b1. Each of the third cam slots 7c—7c for rotating the cam sleeve 7 is a rectilinear slot inclined with respect to the axial direction thereof with an angle larger than that of the rectilinear slot portion 7a1 of the first cam slot 7a.

These cam slots are also arranged in such a manner that the circumferential length l′2 and the axial length l′3 of each of the third cam slot 7c are equal to the circumferential length l2 and the axial length l3 of the first cam slot 7a. The circumferential length l1 of the rectilinear slot portion 7a1 of the first cam slot 7a is shorter than the circumferential length l′2 of the third cam slot 7c but equal to the circumferential length l′1 shown in the third slot in FIG. 2. Thus, the above relations of the length of these slots are as follows:

$$l'1 = l1, \quad l'2 = l2, \quad l'3 = l3$$

Further, the circumferential lengths of the rectilinear slot portion 7a1 and the other slot portion 7a2 in the first cam slot 7 are equal to the circumferential lengths of the arc-shaped cam slot portion 7b1 and other cam slot portion 7b2 in the second cam slot 7b, respectively.

The third cam slots 7c—7c are formed in two parallel slots as shown in FIG. 2 for the purpose of smooth movement of the cam sleeve 7. Accordingly, two pins 15—15 engaged with the slots 7c—7c are provided on the annular frame 14 with a circumferential space remaining therebetween.

Referring to the operation of the present interchangable camera lens, when the operation ring 12 is moved back toward the camera body until the rear end of the operation ring collides against a flanged stopper of the stationary lens barrel 1, the pins 15 moving together with the operation ring and engaging with the third cam slots 7c—7c take the position denoted by "T" in FIG. 2 so that the cam sleeve 7 rotated by the pins 15 takes the utmost counterclockwise rotary position. At this rotary position of the cam sleeve, the pins 9 and 10 engaging with the first and second cam slots 7a and 7b, respectively, take the position denoted by "T" in FIG. 2, where the second lens group $L_2$ is at the rearmost and maximum telephotographing position.

When the operation ring 12 is moved forwardly away from the flanged stopper 1a, the annular frame 14 connected to the operation ring 12 and also the pin 15 fixed to the annular frame are moved forwardly along the axial direction thereof. By the forward movement of the pin 15, the cam sleeve 7 engaged therewith is rotated in the clockwise direction about the axis, whereby the pins 9 and 10 slidably engaged with the first and second cam slots 7a and 7b are moved by the rotation of the cam sleeve. Thus, the second lens group $L_2$ having the pin 9 is moved forwardly toward the wide photographing position to gradually make the focal length shorter and the third lens group $L_3$ is moved to make compensation of focusing. At the time when the pin 15 in the third cam slot 7c takes the position denoted by "W", the pins 9 and 10 in the first and second cam slots 7a and 7b, respectively, take the position "W" where is the widest telephotographing position, shown in FIG. 1.

At this position in FIG. 1, the small ball 17 urged against the inner surface of the cam sleeve 7 by the leaf spring 16 comes into engagement with the small groove 18 in the cam sleeve 7 by click motion. By such click engagement of the ball 17 with the groove 18, the operator becomes aware of the widest telephotographing position of the camera lens. From the position shown in FIG. 2, when the operation ring 12 is further advanced forwardly with force enough to release the engagement of the small ball 17 with the groove 18, the cam sleeve 7 is further rotated in the clockwise direction by the pin 15 moved together with the operation ring and engaged with the third cam slots 7c—7c. Thus, the pins 9 and 10 engaging with the first and second cam slots 7a and 7b are guided to move along the cam slot portions 7a2 and 7b2 for closeup photographing, respectively. At this time, since the cam slot portion 7a2 in the first cam slot 7a extends in the circumferential direction, the pin 9 as well as the second lens group $L_2$ connected with the pin 9 remain as they are without being moved by the rotation of the cam sleeve 7. On the other hand, since the cam slot portion 7b2 in the second cam slot 7b is angled rearwardly, the pin 10 as well as the third lens group $L_3$ connected with the pin 10 are moved rearwardly along the axis of the cam sleeve. By such rearward movement of the third lens group $L_3$ while the second lens group $L_2$ remains at the widest telephotographing position, the closeup photographing becomes possible. The maximum closeup photographing becomes possible in the present interchangable camera lens when the pins 9, 10 and 15 in the first, second and third cam slots 7a, 7b and 7c take the position "N" in FIG. 2, respectively.

On the contrary, when the operation ring is moved backwardly from the maximum closeup photographing position, the cam sleeve 7 is rotated and the second and third lens groups $L_2$ and $L_3$ connected with the pins 9 and 10, respectively, can be moved from the closeup photographing position to telephotographing position.

As it could be understood from the disclosure set forth above, according to the interchangable camera lens of the present invention, it becomes possible to change the photographing state from telephotographing into closeup photographing or vice versa by straightly sliding an outside operation ring in the axial direction thereof. Also, the focusing operation of the present interchangable camera lens can be made by rotating the same operation ring.

Also, in the preferred embodiment of the present invention, since the guide sleeve 3 is provided between the slidable operation ring 12 and the rotatable cam sleeve 7, the operation ring cannot contact the rotating cam sleeve when the operation ring is slided in the axial direction thereof. Thus, the sliding movement of the operation ring becomes very smooth, which makes it very easy to operate the operation ring.

Although the present invention has been described with reference to the puferred embodiment shown in FIGS. 1 and 2, many modifications and alterations may be made within the spirit of the present invention.

What is claimed is:

1. A zooming structure of an interchangable camera lens comprising a stationary barrel means (1), a cam sleeve member (7) provided to rotate about an axis of said barrel means, an operation ring (12) mounted on said barrel means to slide thereon in the axial direction thereof, means (15) connected with said operation ring and slidably engaged with said cam sleeve member for rotating the latter by the sliding movement of said operation ring, wherein said cam sleeve member comprises a first cam slot (7a), in which a pin (9) mounted to a lens ($L_2$) for variable magnification is slidably engaged, and a second cam slot (7b), in which a pin (10) mounted to another lens ($L_3$) for focus compensation is slidably engaged, said first cam slot (7a) having a first rectilinear portion (7a1) inclined at a predetermined angle with respect to the axial direction (A) of the cam sleeve member and a second portion (7a2) angled from the front end of said rectilinear portion toward the circumferential direction (B) thereof, said second cam slot (7b) having a first arc-shaped portion (7b1) curved rearwardly with respect to the circumferential direction of said cam sleeve member and a second portion (7b2) angled rearwardly from the end of the arc-shaped portion, the circumferential lengths of said first and second portions of said first cam slot being equal to those of said first and second portions of said second cam slot, respectively.

2. A zooming structure as claimed in claim 1, wherein said cam sleeve member (7) comprises a third rectilinear cam slot (7c) inclined with respect to the axial direction (A) thereof with an angle larger than that of said first rectilinear portion (7a1) of said first cam slot (7a); the circumferential and axial lengths (l'2, l'3) of said third rectilinear cam slot are equal to the circumferential and axial lengths (l2, l3) of said first cam slot, respectively; said means for rotating the cam sleeve member is a pin (15) connected to move together with said operation ring (12) and slidably engaged with said third rectilinear cam slot (7c).

3. A zooming structure as claimed in claim 1, wherein said cam sleeve member (7) has a small groove (18) in the inner surface thereof and a small ball (17) is urged against the inner surface of said cam sleeve member, said small groove being formed in such a manner that when said cam sleeve member is rotated to move said pins (9) in said first cam slot (7) up to the front end (W) of the first rectilinear portion (7a) where is the widest telephotographing position, said small ball is engaged with said small groove (18).

4. A zooming structure as claimed in claim 2, further comprising a guide sleeve member (3) connected to said stationary barrel means (1) and disposed between said cam sleeve member (7) and said operation ring (12), said guide sleeve member having a straight guide slot (3a) through which said pin (15) in said third cam slot (7c) passes and is connected to move together with said operation ring.

5. A zooming structure as claimed in claim 2, wherein said operation ring (12) has a longitudinal groove (12a) along the axial direction thereof in which a rear projection (11a) on a movable lens barrel (11) is engaged; said movable lens barrel has a lens ($L_1$) and is rotated by the rotation of said operation ring but not moved at all when said operation ring is slided in the axial direction thereof.

6. A zooming structure as claimed in claim 4, wherein said pin (15) in said third cam slot (7c) is secured to an annular frame (14) which is threadedly engaged with threads at the front end of said operation ring.

* * * * *